(12) United States Patent
Shipmon

(10) Patent No.: US 6,799,676 B1
(45) Date of Patent: Oct. 5, 2004

(54) METHOD FOR REPAIRING A CONVEYOR AND APPARATUS THEREFOR

(76) Inventor: Jessie Ray Shipmon, 4023 Hickory View Dr., Indian Springs, OH (US) 45011

(*) Notice: Subject to any disclaimer, the term of this patent is extended or adjusted under 35 U.S.C. 154(b) by 49 days.

(21) Appl. No.: 10/385,285

(22) Filed: Mar. 10, 2003

Related U.S. Application Data

(60) Provisional application No. 60/363,478, filed on Mar. 11, 2002.

(51) Int. Cl.[7] .............................................. B65G 13/00
(52) U.S. Cl. .................. 198/780; 193/35 R; 29/402.09
(58) Field of Search ................................. 198/780–784; 193/35 R, 35 A, 35 SS, 35 TE, 35 MD, 35 F, 35 J, 35 B, 35 S; 29/402.09, 402.14, 402.16

(56) References Cited

U.S. PATENT DOCUMENTS 5,687,676 A * 11/1997 Kai et al. .................... 122/6 A
6,112,875 A *  9/2000 Gibson ....................... 193/35 R
6,481,564 B2 * 11/2002 Kalm ........................... 198/617

* cited by examiner

Primary Examiner—Christopher P. Ellis
Assistant Examiner—Mark A. Deuble
(74) Attorney, Agent, or Firm—Ted Masters

(57) ABSTRACT

A method for repairing a side rail of a roller type conveyer, includes installing a clip on the side rail. The clip has an aperture which replaces a worn or distorted roller aperture on the side rail. The clip is driven onto the side rail at the location of the distorted roller aperture, and grips the side rail so as to maintain the desired location. The end of the roller axle of the roller is then installed into the aperture of the clip to restore proper operation of the conveyer. The repair can be made in a short time, and requires no modification to the side rail.

18 Claims, 7 Drawing Sheets

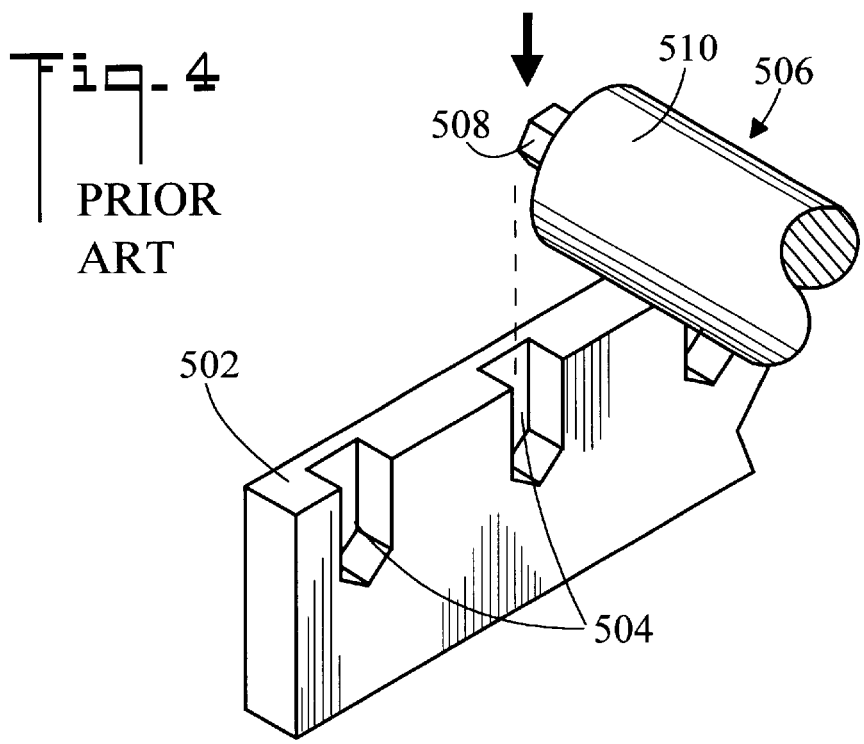
Fig-4 PRIOR ART
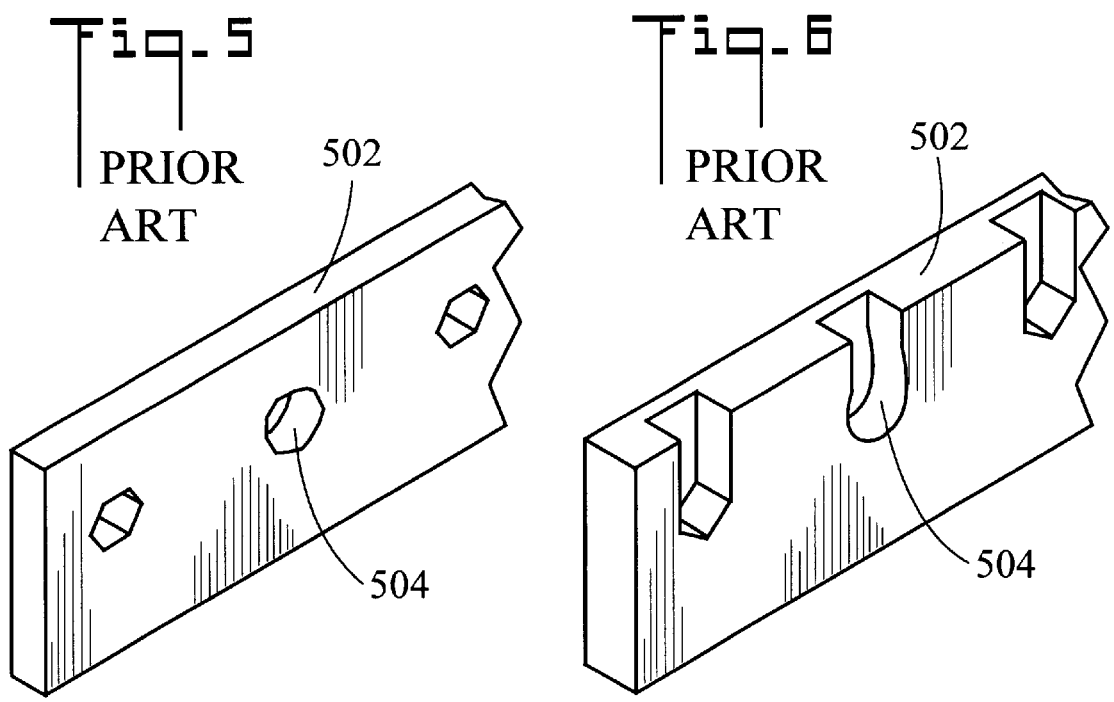
Fig-5 PRIOR ART
Fig-6 PRIOR ART

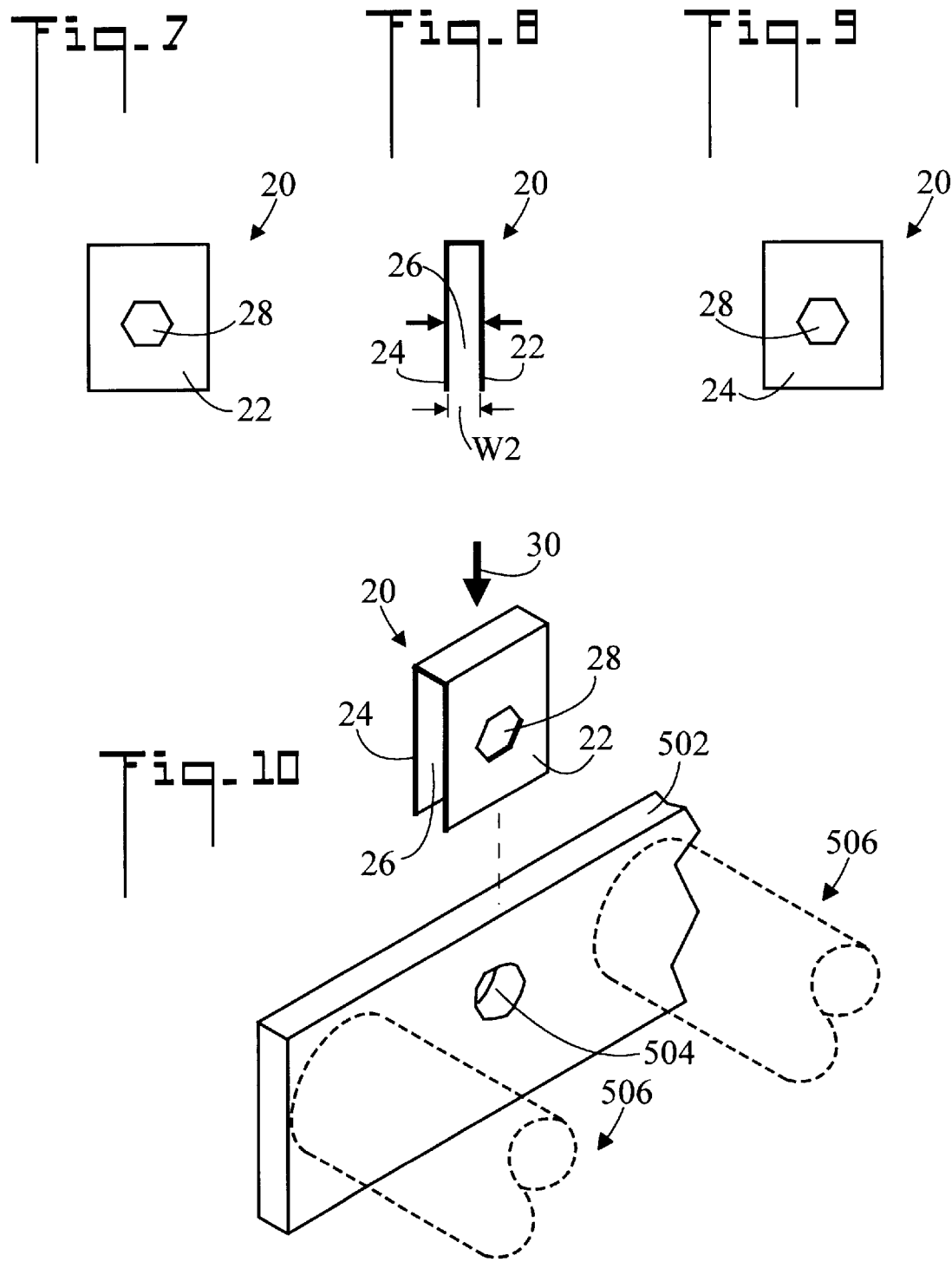

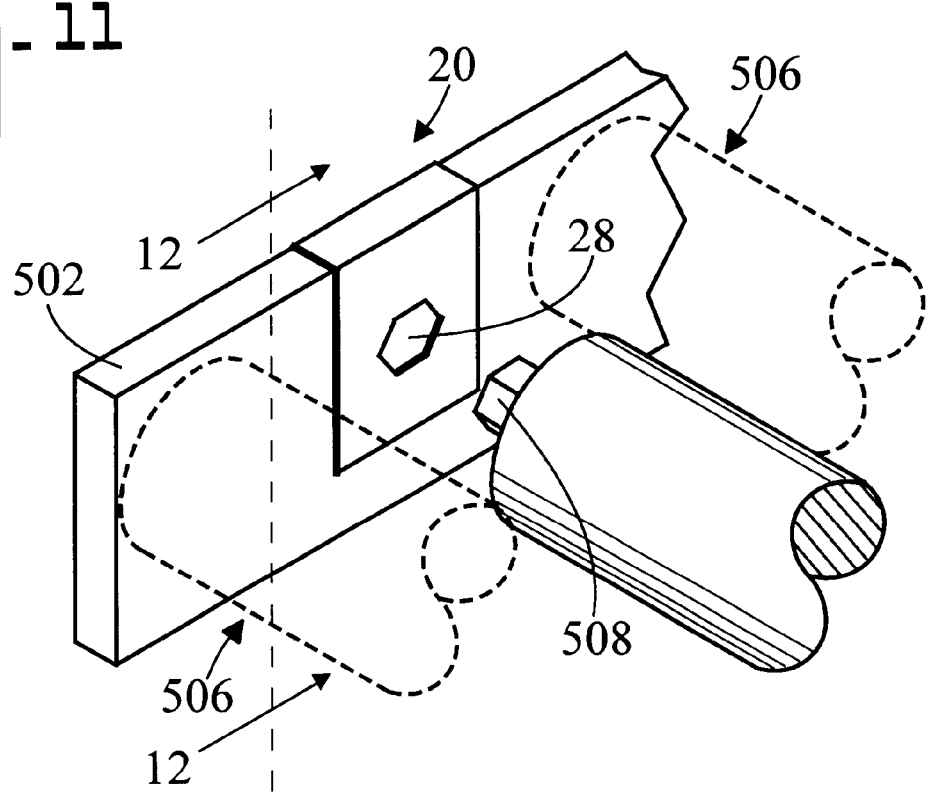
Fig_11
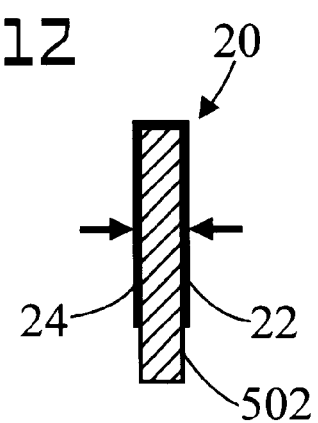
Fig_12

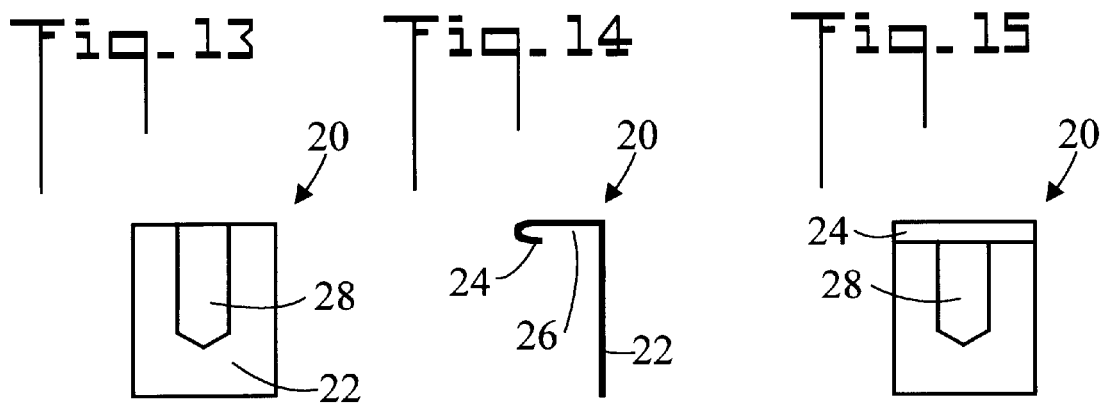
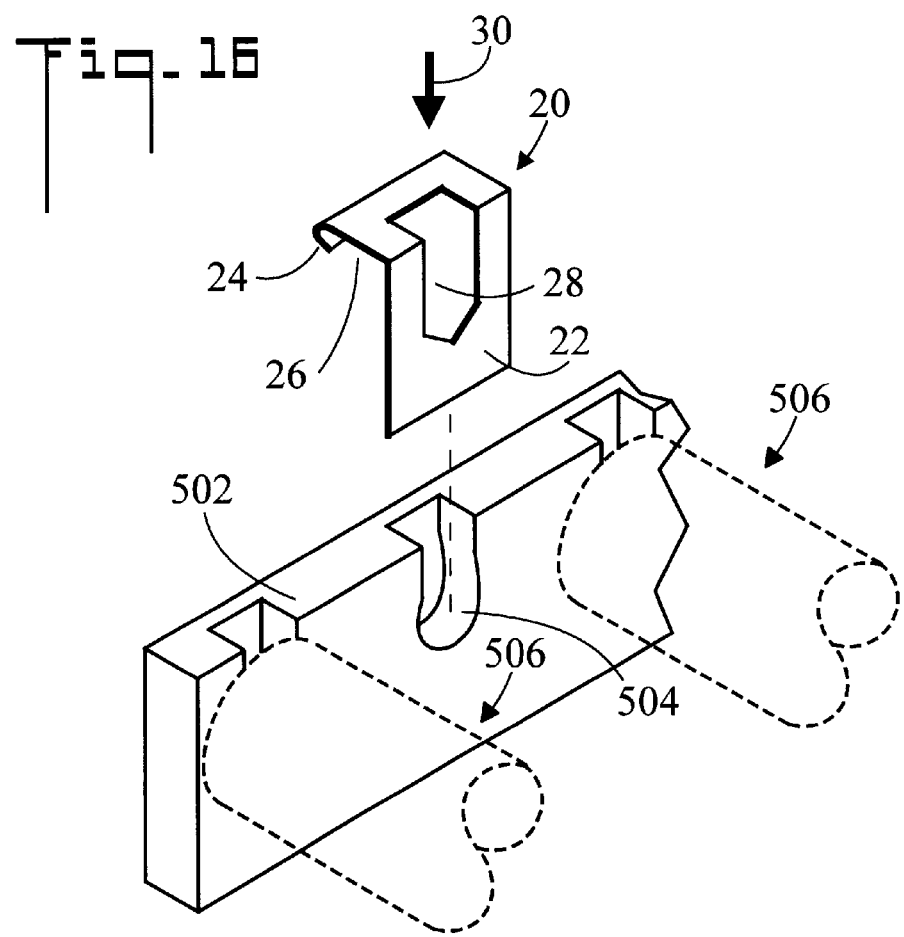

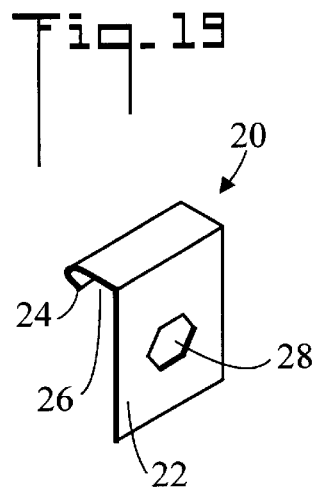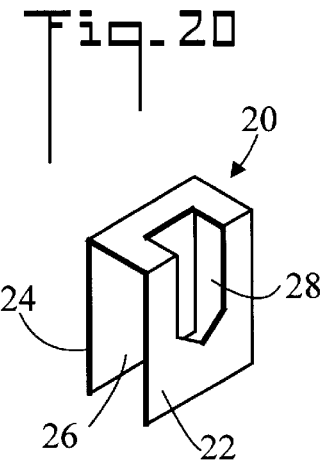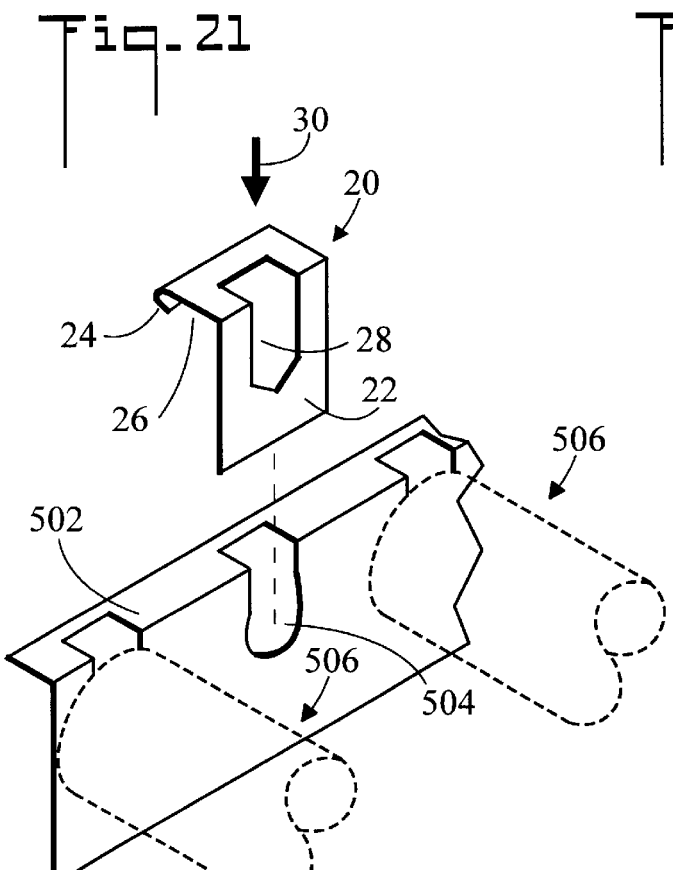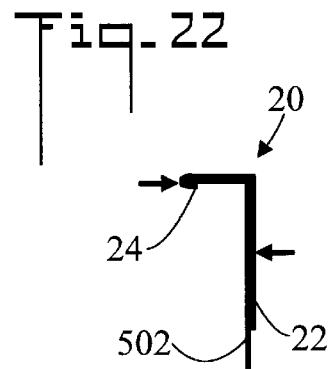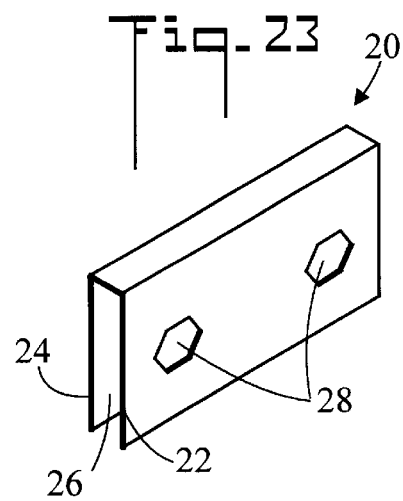

METHOD FOR REPAIRING A CONVEYOR AND APPARATUS THEREFOR

CROSS REFERENCE TO RELATED APPLICATION

This application claims the filing benefit under 35 U.S.C. §119(e) of U.S. Provisional Application No. 60/363,478, filed Mar. 11, 2002, which is included herein by reference.

TECHNICAL FIELD

The present invention pertains generally to roller type conveyors, and more particularly to a method and apparatus for repairing the side rails of such a conveyor.

BACKGROUND OF THE INVENTION

Roller type conveyors are utilized to move items from one location to another. These conveyors comprise a plurality of spaced apart rollers which are mounted between two elongated side rails. Each end of the roller axle engages a roller aperture in one of the side rails, and the roller then rotates about the axle. The items are then placed on the rollers and are conveniently moved from roller-to-roller along the conveyor either by gravity or an urging force.

With time however, the vibration of the rollers causes the roller apertures to wear and distort so that they no longer properly receive the ends of the roller axle, thereby degrading the operation of the conveyor. In extreme cases, the roller can even fall out of the roller aperture. When distortion occurs, even to only one or two roller apertures, repair needs to be made. One common repair method is to replace one or both of the side rails. This is a time consuming and costly process. Another repair method is to add a plurality of reinforcing strips to the side rails. This technique is illustrated in U.S. Pat. No. 6,112,875 which includes a conveyor frame roller shaft alignment strip and method. The invention includes a multi-layer reinforcement strip having a layer of sheet metal and at least one layer of high density plastic material is affixed to the worn frame rails. The reinforcement strip is provided with a plurality of openings formed therein, corresponding in size and spacing to the series of openings in the frame rail prior to being worn for supporting a series of roller support shafts. The multi-layer re-aligns the rollers and reduces conveyor vibration. However, even this procedure is time consuming and expensive.

A method is needed to quickly and inexpensively repair a conveyor side rail. The method should require nether replacement nor modification of the side rail.

SUMMARY OF THE INVENTION

The present invention is directed to a method and apparatus for effecting quick and inexpensive repair of a conveyor side rail. The method and apparatus of the present invention allow repair of the side rail to be made in less than one minute, with no required drilling or other modification to the side rail. Additionally, the present invention allows a roller to be removed, a single new roller aperture installed, and the roller reinstalled without necessitating the removal of adjacent rollers.

The present invention is particularly useful in a field environment where time is of the essence, and where the conveyor users do not have access to repair facilities. For example, if a single conveyer roller is non-operational, that roller may be removed, a new aperture added, and the roller replaced, thereby returning the conveyor to an operating condition.

The present invention is primarily targeted at temporary side rail repair, however the present repair method can last for an extended time period.

In accordance with a preferred embodiment of the invention, a method for repairing a side rail of a conveyer, includes:
 (a) providing a conveyor having:
  two spaced apart side rails, the side rails each having a plurality of spaced roller apertures, wherein at least one of the roller apertures is distorted;
  a plurality of rollers, each roller including an axle about which a cylindrical body freely rotates, the rollers being perpendicularly installed between the two side rails, wherein one end of the roller engages a roller aperture in one side rail and the other end of the roller engages a roller aperture in the other side rail;
 (b) providing a clip for repairing the side rail(s) which has a distorted roller aperture, the clip including:
  a first side connected to an opposite second side;
  an opening disposed between the first and second sides, the opening shaped and dimensioned for receiving the side rail, wherein the clip may be installed onto the side rail and grip the side rail without requiring attachment hardware;
  the first side of the clip having an aperture which has the shape of an undistorted roller aperture;
 (c) removing the roller which engages the distorted roller aperture;
 (d) installing the clip onto the side rail at the location of the distorted roller aperture so that the aperture aligns with the distorted roller aperture; and,
 (e) installing one of (1) the roller that was removed in step (c), and (2) a new roller, in the aperture of the clip installed in step (d).

In accordance with an aspect of the method;
prior to step (d), providing a hammer; and,
in step (d), the installation of the clip onto the side rail including using the hammer to drive the clip onto the side rail.

In accordance with an aspect of the method:
steps (c), (d), and (e) are performed in less than one minute.

In accordance with an aspect of the method:
steps (c), (d), and (e) are performed without having to remove any rollers other than the roller which engages the distorted roller aperture.

In accordance with an aspect of the method:
in step (d), the installation of the clip onto the side rail requiring no modification to the side rail.

In accordance with an aspect of the method:
in step (a), the side rail having a plurality of distorted roller apertures; and, repeating steps (c) through (e) until clips have been installed at all side rail locations having a distorted roller aperture.

Other aspects of the present invention will become apparent from the following detailed description, taken in conjunction with the accompanying drawings, which illustrate, by way of example, the principles of the invention.

BRIEF DESCRIPTION OF THE DRAWINGS

FIG. 4 is a fragmented perspective view of a second side rail embodiment;

FIG. 5 is a perspective view of a worn side rail;

FIG. 6 is a perspective view of a second worn side rail embodiment;

FIG. 7 is a front elevation view of a clip for repairing the side rail of a conveyor in accordance with the present invention;

FIG. 8 is a side elevation view of the clip;

FIG. 9 is a rear elevation view of the clip;

FIG. 10 is a perspective view of the clip being installed on a side rail;

FIG. 11 is a perspective view of the clip installed on the side rail;

FIG. 12 is a cross sectional view along the line 12—12 of FIG. 11;

FIG. 13 is a front elevation view of a second embodiment of the clip;

FIG. 14 is a side elevation view of the second embodiment clip;

FIG. 15 is a rear elevation view of the second embodiment clip;

FIG. 16 is a perspective view of the second embodiment clip being installed on a side rail;

FIG. 19 is a perspective view of another embodiment of the clip;

FIG. 20 is a perspective view of another embodiment of the clip; and,

FIG. 21 is a perspective view of the clip being installed on another side rail embodiment;

FIG. 22 is a cross sectional view of the clip installed on the side rail embodiment of FIG. 21; and, FIG. 23 is a perspective view of another embodiment of the clip.

DETAILED DESCRIPTION OF THE INVENTION

Figure 1:
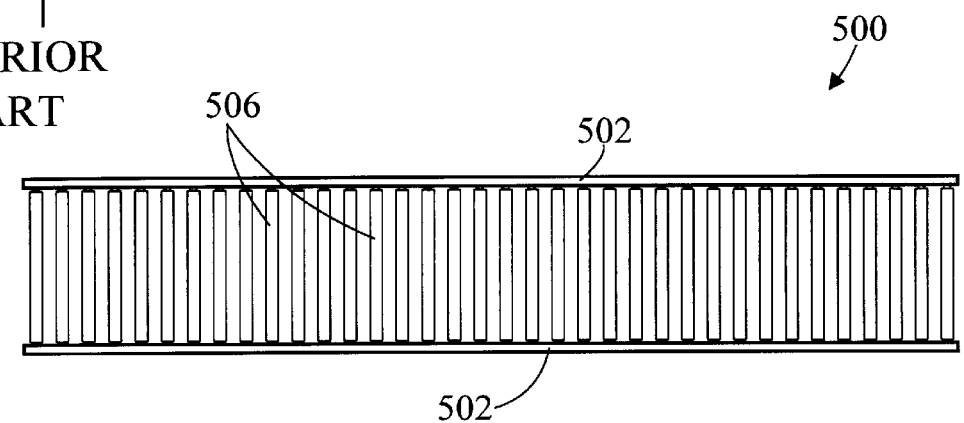
FIG. 1 is a reduced top plan view of a prior art roller type conveyor.
Figure 2:
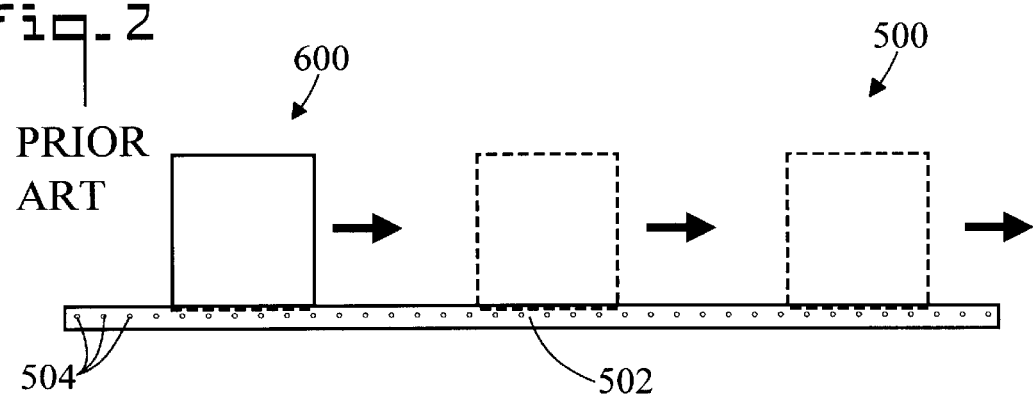
FIG. 2 is a reduced side elevation view of the prior art conveyor.

Referring initially to FIGS. 1 and 2, there are illustrated reduced top plan and side elevation views respectively of a roller type conveyer, generally designated as 500. Conveyor 500 includes two spaced apart side rails 502, side rails 502 each having a plurality of spaced roller apertures 504. Conveyer 500 further includes, a plurality of rollers 506, each roller 506 includes an axle 508 (refer to FIG. 3) about which a cylindrical body 510 freely rotates. Rollers 506 are installed between the two side rails 502, wherein axle 508 of roller 506 engages one roller aperture 504 in each of the side rails 502. Conveyor 500 moves item 600 from one end of the conveyor to the opposite end.

Figure 3:
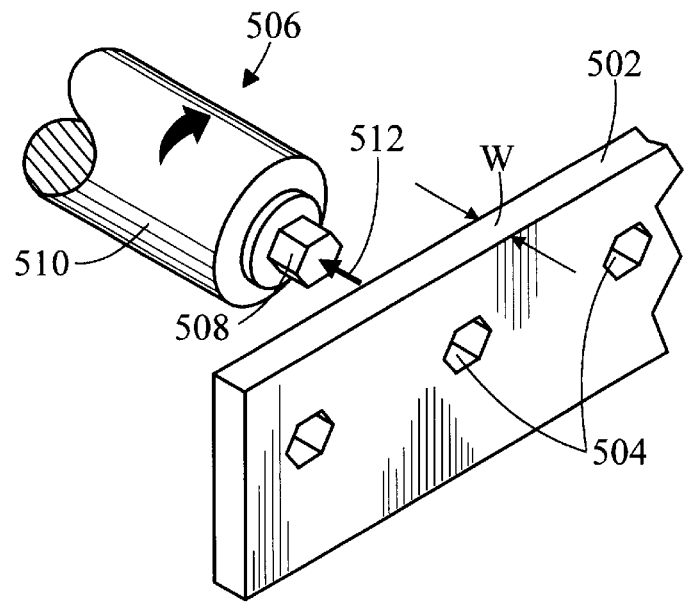
FIG. 3 is a fragmented perspective view of a side rail and roller.

FIG. 3 is a fragmented perspective view of side rail 502 and roller 506, showing roller apertures 504, roller axle 508, and cylindrical body 510. Side rail 502 has a width W1. In the shown embodiment, roller apertures 504 have a hexagonal shape to accept the hexagonal end of roller axle 508. When axle 508 is installed in roller aperture 504, body freely rotates about axle 508. Also in the shown embodiment, roller 506 may be longitudinally compressed in direction 512 (similar to a toilet paper roller) so that it may be installed between the roller apertures 504 of the two side rails 502.

FIG. 4 is a fragmented perspective view of a second prior art side rail 502 embodiment. In this embodiment roller aperture 504 comprises a slot which receives the end of axle 508 of roller 506. It may be appreciated that in this design, rollers 506 may be installed from the top of side rail 502, with no need to compress roller 506 during the installation process.

FIGS. 5 and 6 are perspective views of worn side rails 502. Due to vibration an other mechanical stresses, roller aperture 504 has distorted becoming both enlarged and rounded. As such, these distorted roller apertures 504 do not properly receive the end of axle 508 of roller 506.

Referring not to FIGS. 7–9, there are illustrated front elevation, side elevation, and rear elevation views respectively of a clip for repairing a side rail 502 of a conveyor 500 in accordance with the present invention, the clip generally designated as 20. Clip 20 includes a first side 22 connected to an opposite second side 24. An opening 26 is disposed between first 22 and second side 24. Opening 26 is shaped and dimensioned for receiving side rail 502 (refer to FIGS. 12 and 18), so that clip 20 may be installed onto side rail 502 and grip side rail 502 without requiring attachment hardware (such as screws or bolts and nuts). In an aspect of the invention, clip 20 is hammered onto side rail 502, and remains fixedly in place thereon. In an aspect of the invention, opening 26 has a second width W2 which is slightly less than first width W1 of side rail 502. This ensures that when clip 20 is installed it will tightly grip side rail 502. In another aspect of the invention, first 22 and second 24 sides are biased toward one another to effect the gripping of side rail 502.

First side 22 of clip 20 has an aperture 28 which has the shape of an undistorted roller aperture 504 (refer to FIG. 3). That is, a new roller aperture 504 which has not been subjected to vibration or wear. In the shown embodiment, first side 22 has exactly one aperture 28, so that one clip 20 is used to repair each distorted roller aperture 504. In the shown embodiment, second side 24 of clip 20 also has an aperture 28 having the shape of an undistorted roller aperture 504. The aperture 28 in second side 24 is aligned with the aperture 28 in first side 22 so that axle 508 of roller 506 can engage both apertures 28.

In an aspect of the invention, clip 20 is fabricated from sheet metal which will resiliently bend slightly to accept side rail 502.

FIGS. 10 and 11 are perspective views of clip 20 being installed on side rail 502. Clip 20 is installed onto side rail 502 at the location of distorted roller aperture 504 so that aperture 28 aligns with distorted roller aperture 504 and thereby functionally replaces the distorted roller aperture 504. That is, when clip 20 is installed onto side rail 502, aperture 28 is located at the site of the original undistorted roller aperture 504, thereby providing a new undistorted aperture 28 to receive the end of axle 508 of roller 506 (refer to FIG. 11). Clip 20 is installed on side rail 502 by driving clip 20 downward in direction 30 onto side rail 502 with a hammer. As defined herein, a hammer may be any device which is sufficiently massive to drive clip 20 onto side rail 502. In the installed position, first side 22 is disposed on the side of side rail 502 which faces rollers 506, and second side 24 is disposed on the opposite side of side rail 502. The two sides of clip 20 therefore grip side rail 502. It is important to note that the installation of clip 20 onto the side rail 502 requires no modification (such as drilling) to side rail 502.

FIG. 12 is a cross sectional view along the line 12—12 of FIG. 11, showing clip 20 grip side rail 502. The gripping action of clip 20 keeps clip 20 from moving either up or down or longitudinally along side rail 502.

FIGS. 13–15 are front elevation, side elevation, and rear elevation views respectively of a second embodiment of clip 20. This embodiment is utilized with the slotted side rail 502 shown in FIG. 4. Again clip 20 has a first side 22, a second side 24, an aperture 28 for receiving the end of roller axle 508, and an opening 26 for receiving side rail 502.

Figure 17:
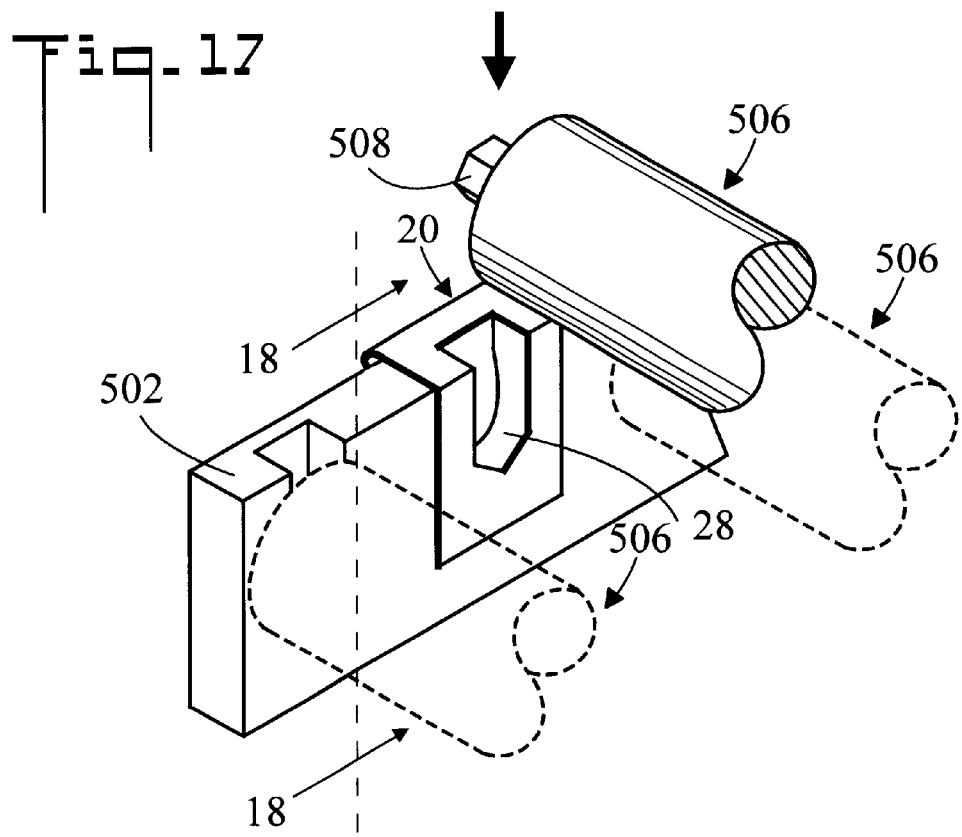
FIG. 17 is a perspective view of the second embodiment clip installed on the side rail.

FIGS. 16 and 17 are perspective views of the second embodiment clip 20 being installed on side rail 502. As with the embodiment shown in FIGS. 10 and 11, clip 20 is driven down in direction 30 onto side rail 502 at the location of the distorted roller aperture 504 thereby forming a new aperture 28 for receiving the end of axle 508 of roller 506.

Figure 18:
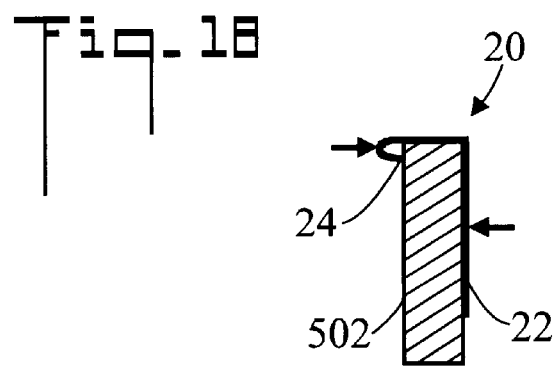
FIG. 18 is a cross sectional view along the line 18—18 of FIG. 17.

FIG. 18 is a cross sectional view along the line 18—18 of FIG. 17, showing clip 20 grip side rail 502.

FIG. 19 is a perspective view of another embodiment of clip 20. In this embodiment, the aperture 28 of FIGS. 7–9 is used with the clip design of FIGS. 13–15.

FIG. 20 is a perspective view of another embodiment of clip 20. In this embodiment, the aperture 28 of FIGS. 13–15 is used with the clip design of FIGS. 7–9.

FIG. 21 is a perspective view of clip 20 being installed on another side rail 502 embodiment. In this embodiment, side rail 502 is not solid, but is rather "L" shaped (refer also to FIG. 22). Clip 20 is installed so that second side 24 surrounds the edge or side rail 502.

FIG. 22 is a cross sectional view of clip 20 installed on the side rail 502 embodiment of FIG. 21. Second side 24 of clip 20 is hooked so that it can surround and capture the edge of side rail 502.

FIG. 23 is a perspective view of another embodiment of clip 20. In this embodiment clip 20 includes a plurality of apertures 28 (two in the shown embodiment, however a larger number could also be used). By using a clip 20 with multiple apertures 28, the repair of more than one distorted roller aperture 504 may be made simultaneously.

In terms of use, a method for repairing a side rail 502 of a conveyer 500, includes:
(a) providing a conveyor 500 having:
   a side rail 502, the side rail 502 having a plurality of spaced roller apertures 504, wherein at least one of the roller apertures 504 is distorted;
   a plurality of rollers 506, each roller 506 including an axle 508 about which a cylindrical body 510 freely rotates, wherein axle 508 of roller 506 engages roller aperture 504;
(b) providing a clip 20 for repairing the side rail 502, clip 20 including:
   a first side 22 connected to an opposite second side 24;
   an opening 26 disposed between first 22 and second side 24, opening 26 shaped and dimensioned for receiving side rail 502, wherein the clip 20 may be installed onto the side rail 502 and grip the side rail 502 without requiring attachment hardware;
   first side 22 of clip 20 having an aperture 28 having the shape of an undistorted roller aperture 504;
(c) removing roller 506 which engages the distorted roller aperture 504;
(d) installing clip 20 onto side rail 502 at the location of the distorted roller aperture 504 so that aperture 28 aligns with the distorted roller aperture 504; and,
(e) installing one of (1) the roller 506 removed in step (c), and (2) a new roller 506, in aperture 28 of the clip 20 installed in step (d). That is, either the same roller or a new roller 506 may be used.

The method further including:
prior to step (d), providing a hammer; and,
in step (d), the installation of clip 20 onto side rail 502 including using the hammer to drive clip 20 onto side rail 20.

The method further including:
steps (c), (d), and (e) being performed in less than one minute.

The method further including:
steps (c), (d), and (e) performed without having to remove any rollers 506 other than the roller 506 which engages the distorted roller aperture 506.

The method further including:
in step (d), the installation of clip 20 onto side rail 502 requiring no modification to side rail 502.

The method further including:
in step (a), side rail 502 having a first width W1;
in step (b), opening 26 in clip 20 having a second width W2 which is slightly less than first width W1 of side rail 502.

The method further including:
in step (b), first 22 and second 24 sides biased toward one another to effect the gripping of side rail 502.

The method further including:
in step (b), first side 22 of clip 20 having one of (1) exactly one aperture 28, and (2) a plurality of apertures 28.

The method further including:
in step (a), said side rail having a plurality of said distorted roller apertures; and,
repeating steps (c) through (e) until said clips have been installed at all said side rail locations having a said distorted roller aperture.

The method further including:
the method implementing a temporary repair of side rail 502, wherein at a later time the entire side rail 502 is replaced.

The preferred embodiments of the invention described herein are exemplary and numerous modifications, variations, and rearrangements can be readily envisioned to achieve an equivalent result, all of which are intended to be embraced within the scope of the appended claims.

I claim:

1. A method for repairing a side rail of a conveyer, comprising:
   (a) providing a conveyor having:
      a side rail, said side rail having a plurality of spaced roller apertures, wherein at least one of said roller apertures is distorted;
      a plurality of rollers, each said roller including an axle about which a cylindrical body rotates, wherein said axle of said roller engages said roller aperture;
   (b) providing a clip for repairing said side rail, said clip including:
      a first side connected to an opposite second side;
      an opening disposed between said first and second sides, said opening shaped and dimensioned for receiving said side rail, wherein said clip may be installed onto said side rail and grip said side rail without requiring attachment hardware;
      said first side of said clip having an aperture having the shape of an undistorted said roller aperture;
   (c) removing said roller which engages said distorted roller aperture;

(d) installing said clip onto said side rail at the location of said distorted roller aperture so that said aperture aligns with said distorted roller aperture; and, (e) installing one of (1) said roller removed in step (c), and (2) a new said roller, in said aperture of said clip installed in step (d).

2. The method of claim 1, further including:

prior to step (d), providing a hammer; and, in step (d), said installation of said clip onto said side rail including using said hammer to drive said clip onto said side rail.

3. The method of claim 2, further including:

steps (c), (d), and (e) being performed in less than one minute.

4. The method of claim 1, further including:

steps (c), (d), and (e) performed without having to remove any said rollers other than said roller which engages said distorted roller aperture.

5. The method of claim 1, further including:

in step (d), said installation of said clip onto said side rail requiring no modification to said side rail.

6. The method of claim 1, further including:

in step (a), said side rail having a first width;

in step (b), said opening in said clip having a second width which is less than said first width of said side rail.

7. The method of claim 1, further including:

in step (b), said first and second sides biased toward one another to effect said gripping of said side rail.

8. The method of claim 1, further including:

in step (b), said first side of said clip having one of (1) exactly one said aperture, and (2) a plurality of said apertures.

9. The method of claim 1, further including:

in step (a), said side rail having a plurality of said distorted roller apertures; and, repeating steps (c) through (e) until said clips have been installed at all said side rail locations having a said distorted roller aperture.

10. The method of claim 1, further including:

said method implementing a temporary repair of said side rail, wherein at a later time said entire side rail is replaced.

11. A clip for repairing a side rail of a conveyor, the side rail having a plurality of spaced roller apertures for receiving the axles of a plurality of rollers, wherein at least one of the roller apertures is distorted, said clip comprising:

a first side connected to an opposite second side;

an opening disposed between said first and second sides, said opening shaped and dimensioned for receiving the side rail, wherein said clip may be installed onto the side rail and grip the side rail without requiring attachment hardware;

said first side of said clip having an aperture having the shape of an undistorted roller aperture; and, wherein said clip may be installed onto the side rail at the location of the distorted roller aperture so that said aperture aligns with the distorted roller aperture and functionally replaces same.

12. A clip according to claim 11, further including:

said installation of said clip onto the side rail including driving said clip onto the side rail.

13. A clip according to claim 11, further including:

said installation of said clip onto the side rail requiring no modification to the side rail.

14. A clip according to claim 11, the side rail having a first width, said clip further including:

said opening having a second width which is less than the first width of the side rail.

15. A clip according to claim 11, further including:

said first and second sides biased toward one another to effect said gripping of the side rail.

16. A clip according to claim 11, further including:

said second side of said clip having also having an aperture having the shape of an undistorted roller aperture, said aperture in said second side being aligned with said aperture in said first side.

17. A clip according to claim 11, further including:

said first side of said clip having one of (1) exactly one said aperture, and (2) a plurality of said apertures.

18. A clip according to claim 11, further including:

said installation of said clip onto the side rail including driving said clip onto the side rail;

said installation of said clip onto the side rail requiring no modification to the side rail; and, said first side of said clip having exactly one said aperture.

* * * * *